United States Patent [19]

Grell

[11] 4,040,688

[45] Aug. 9, 1977

[54] NOVEL CYLINDRICAL ROLLERS

[75] Inventor: Karl-Ludwig Grell, Aurachtal, Germany

[73] Assignee: Industriewerk Schaeffler OHG, Herzogenaurach, Germany

[21] Appl. No.: 520,621

[22] Filed: Nov. 4, 1974

[30] Foreign Application Priority Data

Dec. 8, 1973 Germany .............................. 2361330

[51] Int. Cl.² .......................... C21D 9/64; F16C 33/26
[52] U.S. Cl. .................................. 308/202; 148/12 B; 308/DIG. 8
[58] Field of Search ............... 148/12 B; 308/DIG. 8, 308/202

[56] References Cited

U.S. PATENT DOCUMENTS

| 3,231,432 | 1/1966 | McLean et al. | 148/12 B |
|---|---|---|---|
| 3,584,494 | 6/1971 | Geipel et al. | 148/12 B |
| 3,674,570 | 7/1972 | Hallstrom et al. | 148/12 B |
| 3,783,043 | 1/1974 | Almond et al. | 148/12 B |
| 3,844,848 | 10/1974 | Stacey | 148/12 B |

OTHER PUBLICATIONS

Anti-Friction Bearings by Hudson T. Morton (1954) p. 126.

*Primary Examiner*—Richard A. Bertsch
*Attorney, Agent, or Firm*—Hammond & Littell

[57] ABSTRACT

Novel cylindrical rollers for antifriction bearings made of steel with a carbon content of 0.7 to 1.2% by weight, a sorbitic structure and a hardness increased by cold annealing to at least 50 HRC and a novel process for the preparation of said rollers.

3 Claims, No Drawings

NOVEL CYLINDRICAL ROLLERS

STATE OF THE ART

The rollers used until now involve considerable manufacturing expense as they are made of wire which is first heat rolled at a temperature of about 1000° C. Thereafter, the wire is coiled and allowed to cool but this pre-rolled wire cannot be drawn yet because, due to irregular cooling in the coil, it differs substantially in its structure formation. Because of the long exposure to oxygen during the cooling process, it also has a thick scale (oxide) layer. To give the wire thus pre-rolled a structure formation which makes it drawable, it is heated to 700° to 800° C, and this temperature is maintained for several hours. Then, the wire is cooled in the furnace to about 600° C and thereafter, in still air, to room termperature. After descaling and possibly phosphatizing, the wire can then be drawn. The structural state of the wire achieved by the above annealing permits in cold drawing a reduction of 50 to 60%, or at most 70%. If further drawing is necessary, an intermediate annealing must be interposed.

From the wire thus prepared, the rollers are then produced by cutting to the desired length after which they are subjected to a scouring operation, and after hardening and tempering they are finally brought to the required final dimension by grinding.

OBJECTS OF THE INVENTION

It is an object of the invention to provide novel rollers having better properties and more favorable structure than known rollers.

It is another object of the invention to provide a more economical process for the production of rollers for antifriction bearings.

These and other objects and advantages of the invention will become obvious from the following detailed description.

THE INVENTION

The novel cylindrical rollers for antifraction bearings of the invention are made of steel with a carbon content of 0.7 to 1.2%, a sorbitic structure and a hardness increased by cold annealing to at least 50 HRC.

The desired sorbitic structure is obtained during the wire production wherein after the hot rolling at about 1000° C, the wire is cooled during subsequent looping or during immediate coiling, to a temperature which corresponds to the lower pearlite stage of the respective material and then converts isothermally.

The sorbitic structure obtained in this way makes it possible now to draw the wire after descaling and phosphatizing without requiring intermediate annealing. Also, descaling does not take as long as with the conventional wires because the oxide layer is thinner due to the shorter exposure to oxygen.

This wire of sorbitic structure permits in cold drawing a reduction which is substantially above the conventional wire and which may be as high as 90%. This renders intermediate annealing during drawing superfluous. Simultaneously with such a high cold reduction, cold annealing is achieved whereby the hardness of the wire is increased to at least 50 HRC. In less important cases, this hardness is already sufficient for the hardness of the rollers. All that is then still necessary to do is to cut this wire into the proper lengths, and to scour, grind and anneal the wire sections without need for additional hardening.

In cases where a higher hardness is required of the rollers, an advantageous development of the invention provides for following the above described production process by the usual martensite hardening and tempering, whereby at a tempering temperature of 170° C the hardness of the rollers can be increased to at least 63 HRC. In this case, therefore, an additional hardening of the rollers is necessary as in prior art. But the hardening process takes place faster because, the carbon due to the sorbitic structure, is present in finest distribution in the starting state and thus no diffusion time is necessary for the dissolution of the carbon in the austenitic state. Moreover such an additionally hardened roller has the advantage that compared with conventional rollers it can be tempered at a higher temperature without unduly losing much of its hardness. Thus, rollers of this kind which according to the invention have sorbitic structure and have been subjected to martensite hardening can be tempered at 250° C and they will retain a hardness of at least 60 HRC. Such rollers can therefore be used in bearings which in operation are exposed to higher temperatures than was the case until now.

To summarize, it may be said that by the invention the advantage in all cases is achieved, compared to the prior art, that in the production of the wire the basic annealing required after hot rolling and the intermediate annealing between the drawing operations become superfluous thereby affording great savings of thermal energy. In simple practical cases, even the hardening operation in roler production may be omitted because sufficient hardness is already obtained by the cold annealing during the wire drawing.

Various modifications of the products and process of the invention may be made without departing from the spirit or scope thereof and it should be understood that the invention is intended to be limited only as defined in the appended claims.

I claim:

1. A process for the preparation of rollers comprising hot rolling steel wire with a carbon content of 0.7 to 1.2% by weight, cooling the wire during or after coiling of the wire, reducing the wire by cold reduction without intermediate annealing whereby the wire hardness is increased to at least 50 HRC and then forming the rollers with a carbon content of 0.7 to 1.2% by weight, a sorbitic structure and a hardness of at least 50 HRC.

2. Cylindrical rollers for antifriction bearings made by the process of claim 1.

3. Cylindrical rollers of claim 2 wherein the hardness is increased by an additional martensite hardening with subsequent tempering at 170° C to at least 63 HRC, and that a hardness of at least 60 HRC still exists at a tempering temperature of 250° C.

* * * * *